(12) United States Patent
Chandu et al.

(10) Patent No.: US 9,363,414 B2
(45) Date of Patent: Jun. 7, 2016

(54) HALFTONE MECHANISM

(71) Applicants: Kartheek Chandu, Longmont, CO (US); Mikel J. Stanich, Longmont, CO (US); Chai Wah Wu, Hopewell Junction, NY (US); Barry M. Trager, Yorktown Heights, NY (US)

(72) Inventors: Kartheek Chandu, Longmont, CO (US); Mikel J. Stanich, Longmont, CO (US); Chai Wah Wu, Hopewell Junction, NY (US); Barry M. Trager, Yorktown Heights, NY (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/527,057

(22) Filed: Oct. 29, 2014

(65) Prior Publication Data

US 2015/0055185 A1 Feb. 26, 2015

Related U.S. Application Data

(63) Continuation-in-part of application No. 13/345,466, filed on Jan. 6, 2012, now Pat. No. 9,036,212.

(51) Int. Cl.
*H04N 1/40* (2006.01)
*G06K 15/02* (2006.01)
*H04N 1/405* (2006.01)

(52) U.S. Cl.
CPC ........ *H04N 1/40087* (2013.01); *G06K 15/1881* (2013.01); *H04N 1/4051* (2013.01)

(58) Field of Classification Search
CPC ............ H04N 1/40087; H04N 1/4051; G06K 15/1881

USPC ......... 358/3.06, 3.01, 3.3, 501, 512, 534, 536
See application file for complete search history.

(56) References Cited

U.S. PATENT DOCUMENTS

| | | | |
|---|---|---|---|
| 5,923,774 | A | 7/1999 | Ostronmoukhov |
| 6,563,957 | B1* | 5/2003 | Li et al. .......................... 382/252 |
| 7,446,904 | B2 | 11/2008 | Stanich et al. |
| 7,593,135 | B2 | 9/2009 | Luo et al. |
| 7,911,646 | B2 | 3/2011 | Chang |
| 2004/0233477 | A1 | 11/2004 | Stanich et al. |
| 2010/0033764 | A1 | 2/2010 | Guo et al. |
| 2010/0045722 | A1* | 2/2010 | Chandu et al. ................... 347/15 |
| 2011/0141525 | A1 | 6/2011 | Ng et al. |

OTHER PUBLICATIONS

Direct Multi-Bit Search (DMS) Screen Algorithm, Kartheek Chandu, Mikel Stanich, Chai Wah Wu, Barry Trager, 2012.*
"PCT Search Report and Written Opinion", PCT/US12/71516, (Mar. 13, 2013), 9 pages.
Lee, Changhyung, et al., "The Hybrid Screen—Improving the Breed", *IEEE 1057-7149*, (2010), 435-450.

* cited by examiner

*Primary Examiner* — Quang N Vo
(74) *Attorney, Agent, or Firm* — Blakely, Sokoloff, Taylor & Zafman LLP

(57) ABSTRACT

A method is disclosed. The method includes applying a human visual system (HVS) model to a Continuous Tone Image (CTI) and a initial Half Tone Image (HTI) to generate a perceived CTI and a perceived HTI and computing a change in pixel error for a first pixel by toggling the first pixel with all the possible output states and swapping the first pixel with all neighbor pixels.

19 Claims, 5 Drawing Sheets

HALFTONE MECHANISM

CROSS REFERENCE TO RELATED APPLICATIONS

The present patent application is a Continuation-in-part application claiming priority to application Ser. No. 13/345,466, filed Jan. 6, 2012 which is pending.

FIELD OF THE INVENTION

The invention relates to the field of image reproduction, and in particular, to digital halftoning.

BACKGROUND

Digital halftoning is a technique for displaying a picture on a two-dimensional medium, in which small dots and a limited number of colors are used. The picture appears to consist of many colors when viewed from a proper distance. For example, a picture consisting of black and white dots can appear to display various gray levels. Digital printers, which were initially pure black and white machines with a very coarse resolution, have evolved to accommodate colors, finer resolutions, and more recently, more than one bit of information per pixel (referred to as "multi-bit" or "multi-tone"). In multi-bit printers, the output is no longer necessarily binary (e.g., each pixel is either "on" or "off"). However for historical reasons the output continues to be referred to as an "halftone image" or an "multi-bit halftone image. With the prevalence of devices having multi-bit capability there is a potential to improve overall image quality of print jobs using multi-bit halftoning.

Accordingly, an algorithm to perform multi-bit halftoning to create an image screen is desired.

SUMMARY

In one embodiment, a method is disclosed. The method includes applying a human visual system (HVS) model to a Continuous Tone Image (CTI) and a initial Half Tone Image (HTI) to generate a perceived CTI and a perceived HTI and computing a change in pixel error for a first pixel by toggling the first pixel with all the possible output states and swapping the first pixel with all neighbor pixels

BRIEF DESCRIPTION OF THE DRAWINGS

A better understanding of the present invention can be obtained from the following detailed description in conjunction with the following drawings, in which.

DETAILED DESCRIPTION

A direct multi-bit search halftoning mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
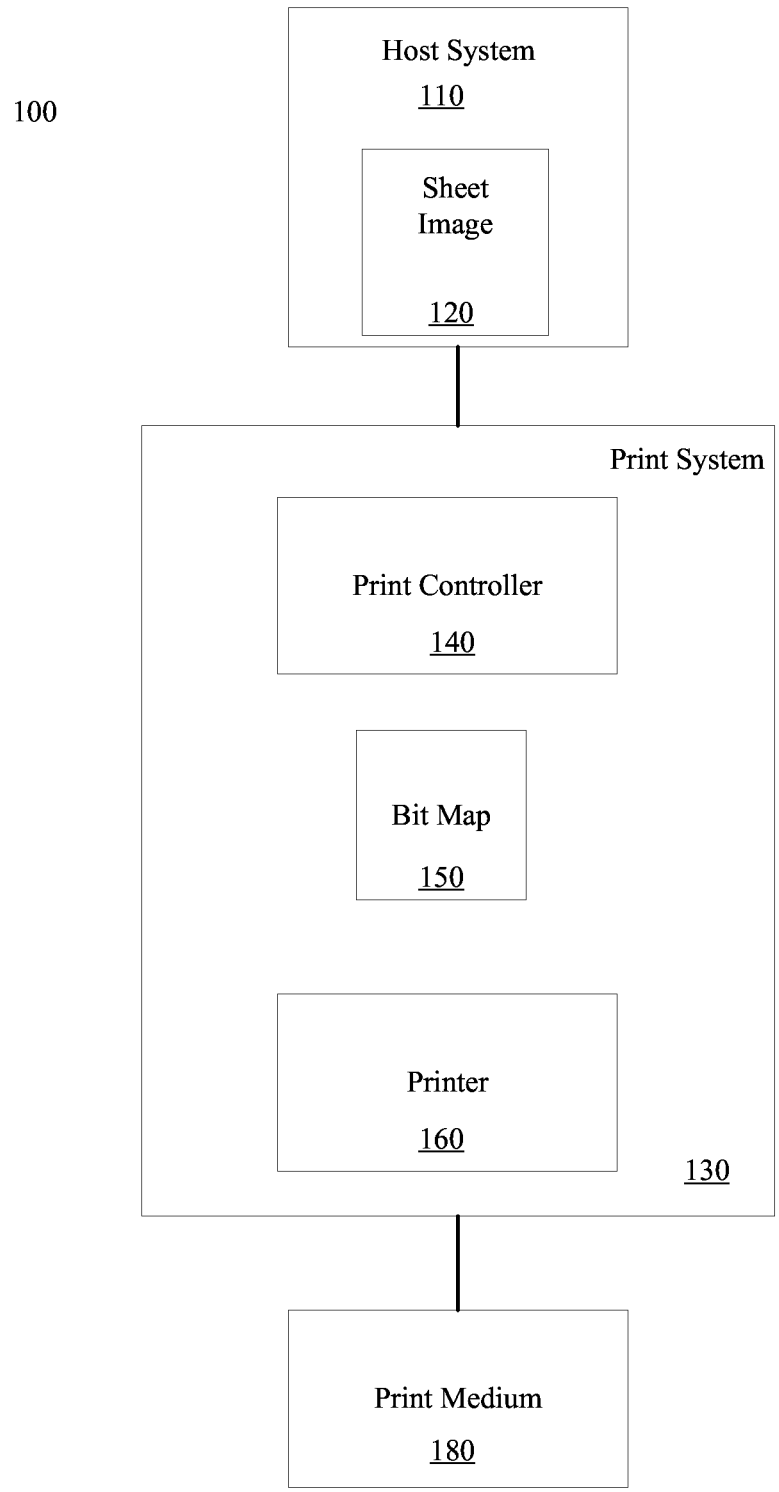
FIG. 1 illustrates one embodiment of a printing network.

FIG. 1 is a block diagram illustrating a printing network 100. Network 100 includes a host system 110 in communication with a printing system 130 to print a sheet image 120 onto a print medium 180 (e.g., paper) via a printer 160. The resulting print medium 180 may be printed in color and/or in any of a number of gray shades, including black and white.

The host system 110 may include any computing device, such as a personal computer, a server, or even a digital imaging device, such as a digital camera or a scanner. The sheet image 120 may be any file or data that describes how an image on a sheet of print medium should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. In one embodiment, the printing system 130 includes the printer 160 that presents the bitmap 150 onto the print medium 180 (e.g., via toner, ink, etc.) based on the sheet image 120.

Figure 2:
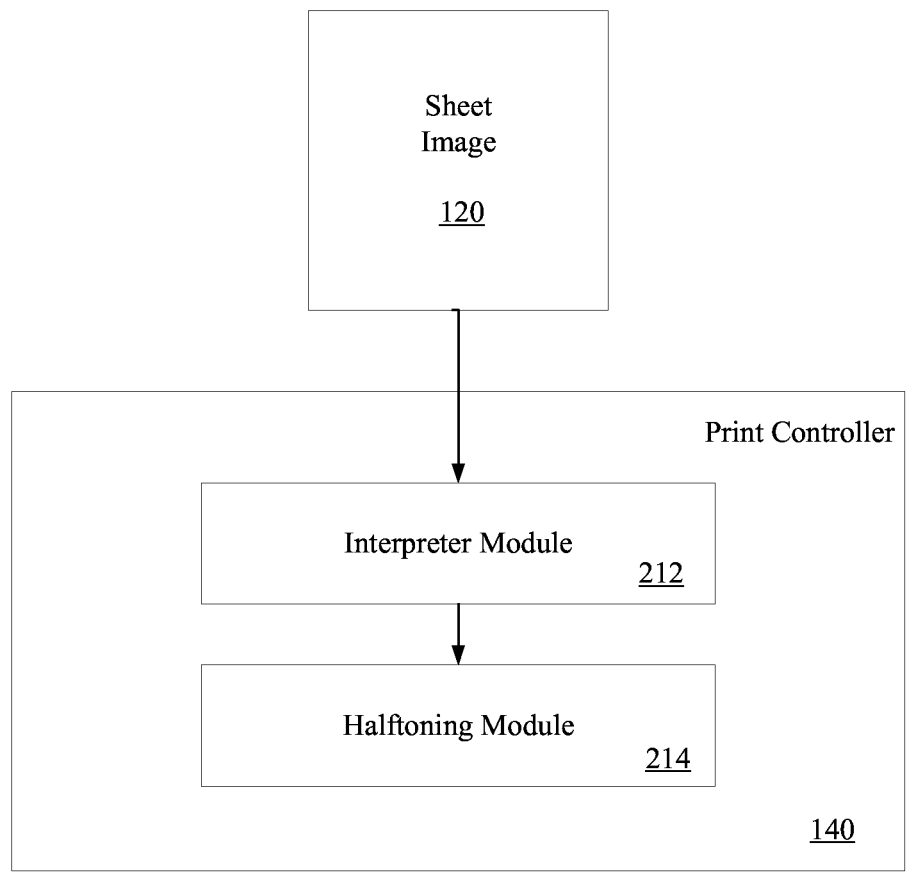
FIG. 2 illustrates one embodiment of a print controller.

The print controller 140 may be any system, device, software, circuitry and/or other suitable component operable to transform the sheet image 120 for generating the bitmap 150 in accordance with printing onto the print medium 180. FIG. 2 is a block diagram illustrating an exemplary print controller 140.

Referring to FIG. 2, the print controller 140, in its generalized form, includes an interpreter module 212 and a halftoning module 214. In one embodiment, these separate components represent hardware used to implement the print controller 140. Alternatively or additionally, the components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a two-dimensional array of pixels representing an image of the print job (e.g., a continuous tone image (CTI), also referred to as full sheetside bitmaps).

The two-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as patterns of ink drops or other dots, having one or more different drop of dot sizes. For example, the halftoning module 214 may convert the continuous tone sheetside bitmaps to a pattern of ink drops for application to the print medium 180 (e.g., paper). Once computed, the halftoning module 214 transfers the converted sheetside bitmaps to the print head controllers of the printer 160 to apply the ink drop(s) to the tangible medium 180.

According to one embodiment, halftoning module 214 performs halftoning of an image using a Direct Multi-bit Search (DMS) algorithm which is an extension to Direct Binary Search (DBS) algorithm. The DMS algorithm is an iterative/recursive search heuristic that uses a perceptual filter, such as a Human Visual System (HVS) model, to minimize the perceived error difference ($\epsilon$), between a continuous tone image (CTI) and its corresponding rendered halftone image (HTI). An HVS model is used by image processing, video processing and computer vision experts to deal with biological and psychological processes. Such a model is used to simplify the behaviors of what is a very complex system. This error in the HVS model is represented as:

$\epsilon = |h(x,y)g(x,y) - h(x,y)f(x,y)|^2 dxdy$, where ** denotes 2-dimensional convolution, $h(x,y)$ represents the point spread function (PSF) of the human visual system or other suitable filtering function, $f(x,y)$ is the continuous tone original image and $g(x,y)$ is the halftone image corresponding to the original image, where all image values are assumed to lie between 0 (white) and 1 (black).

The halftone image $g(x,y)$ itself incorporates a printer model. $g(x,y) = \int \Sigma_m \Sigma_n g[m,n] p(x-mX, y-nX)$, which represents the combination of the digital halftone image $g[m,n]$ with a spot profile $p(x,y)$ having device PEL spacing X, where X is the inverse of the printer addressability DPI. Superposition is assumed in this model for the interaction between overlapping spots. The digital halftone image $g[m,n]$ can have any absorptance value between 0 (white) and 1 (black).

DMS is an algorithm that makes several passes through the halftone image (HTI) before converging to the final HTI. The DMS algorithm starts by generating an initial halftone image, then a local improvement to the halftone image is produced by swapping and toggling, ultimately resulting in an optimized halftone image by selecting the most appropriate swaps and toggles. Where swapping is the operation of switching the absorptance values of nearby pixels and toggling is the operation of changing the absorptance value of individual pixels.

The cost function represented as $\epsilon = <\tilde{e}, \tilde{e}>$, where $<\cdot,\cdot>$ denotes the inner product and $\tilde{e}(x,y) = h(x,y)(g(x,y)-f(x,y))$ represents the perceptually filtered error. In such an embodiment, the CTI $f(x,y)$ may also be expressed in terms of its samples $f[m,n]$ where $(m,n)$ are coordinate on the halftone array or printer grid. Thus, the perceived error is given by $\tilde{e}(x,y) = \Sigma_{m,n} e[m,n] p(x-mX, y-nX)$, where $e[m,n] = g[m,n] - f[m,n]$, and $\tilde{p}(x,y) = h(x,y)p(x,y)$ is the perceived printer spot profile.

Considering the effect of a trial change. The new error will be $\tilde{e}' = \tilde{e} + \Delta\tilde{e}$. Substituting this and expanding the inner product results in $\epsilon' = \epsilon + 2<\Delta\tilde{e}, \tilde{e}> + <\Delta\tilde{e}, \Delta\tilde{e}>$, assuming all signals are real-values. Either a toggle at pixel $(m_0, n_0)$ or a swap between pixels $(m_0, n_0)$ and $(m_1, n_1)$ can be represented as $g'[m,n] = g[m,n] + \Sigma_i a_i \delta[m-m_i, n-n_i]$. As a result, $$\Delta\tilde{e}(x,y) = \Sigma_i a_i \tilde{p}(x-m_i X, y-n_i X), \text{ and}$$

$$\Delta\epsilon = 2\Sigma_i C_{\tilde{p}\tilde{e}}[m_i, n_i] + \Sigma_{i,j} a_i a_j C_{\tilde{p}\tilde{p}}[m_i - m_j, n_i - n_j], \text{ where}$$

$$C_{\tilde{p}\tilde{e}}[m,n] = <\tilde{p}(x,y), \tilde{e}(x+mX, y+nX)>, \text{ and}$$

$$C_{\tilde{p}\tilde{p}}[m,n] = <\tilde{p}(x,y), \tilde{p}(x+mX, y+nX)>.$$

According to one embodiment, a richer class of HVS model is implemented that yields enhanced halftoning results. This model is based on mixed Gaussian functions whose functional form is:

$C_{\tilde{p}\tilde{p}}[u,v] = k_1 \exp(-(u^2+v^2)/2\sigma_1^2) + k_2 \exp(-(u^2+v^2)/2\sigma_2^2)$, where the constants k1; k2; $\sigma_1$; $\sigma_2$ are the values 43.2, 38.7, 0.02, 0.06 respectively. Assuming that $C_{\tilde{p}\tilde{p}}$ is symmetric, then:

$$\Delta\epsilon = 2(\Sigma_i C_{\tilde{p}\tilde{e}}[m_i, n_i] + \Sigma_{i<j} a_i a_j C_{\tilde{p}\tilde{p}}[m_i - m_j, n_i - n_j]) + \Sigma_i a_i^2 C_{\tilde{p}\tilde{p}}[0,0].$$

Assuming that a given printer can produce S possible output states/drops with absorptance levels $\alpha_1, \alpha_2, \ldots, \alpha_S$ at every PEL location. Then, $a_i$ represents the amount of change in the gray level for toggle as: $a_i = g_{new}[m_i, n_i] - g_{old}[m_i, n_i]$. A swap between pixels i and j is equivalent to two toggles with $g_{new}[m_j, n_j] = g_{old}[m_i, n_i]$ and $g_{new}[m_i, n_i] = g_{old}[m_j, n_j]$. Thus, the amount of change in the gray level for swap is represented as $a_i = g_{old}[m_j, n_j] - g_{old}[m_i, n_i]$ and $a_j = g_{old}[m_i, n_i] - g_{old}[m_j, n_j]$. Then $a_j = -a_i$ except for j=0 (e.g., toggle, $a_0 = 0$).

Figure 3:
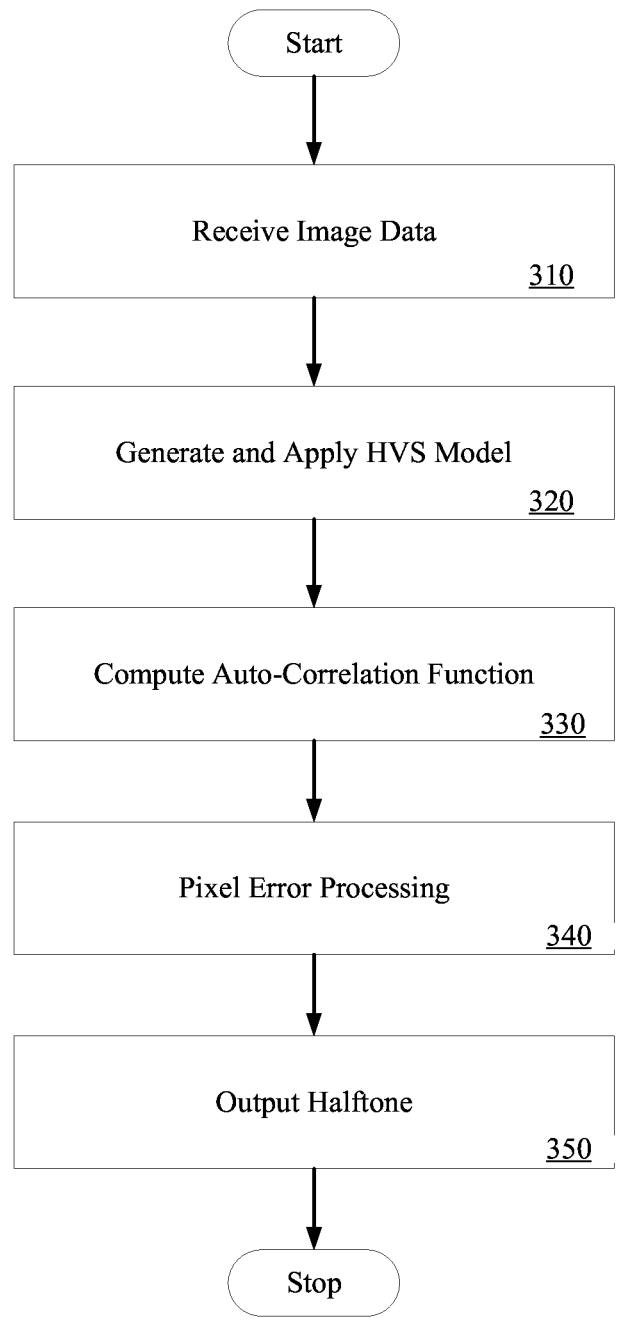
FIG. 3 is a flow diagram illustrating one embodiment of a multi-bit halftoning process.

FIG. 3 is a flow diagram illustrating one embodiment of a multi-bit halftoning process using the DMS algorithm based on $a_i$ and $a_j$. At processing block 310, Continuous Tone Image (CTI) image and halftone image (HTI) data is received at halftone module 214. In one embodiment, a CTI $f(m,n)$ is of size M×N, the permissible levels in the CTI image are any of the gray level values from the set of values=0, $1/C_1, \ldots, 2/C_1, \ldots, C_1/C_1$. In a preferred embodiment, an eight bit screen design, $C_1$ would be equal to 255. At processing block 320, a HVS model is generated and applied to the CTI and HTI to generate a perceived CTI and HTI. At processing block 330, the auto-correlation function $C_{\tilde{p}\tilde{p}}[m,n]$ is computed. At processing block 340, pixel error processing is performed.

Figure 4:
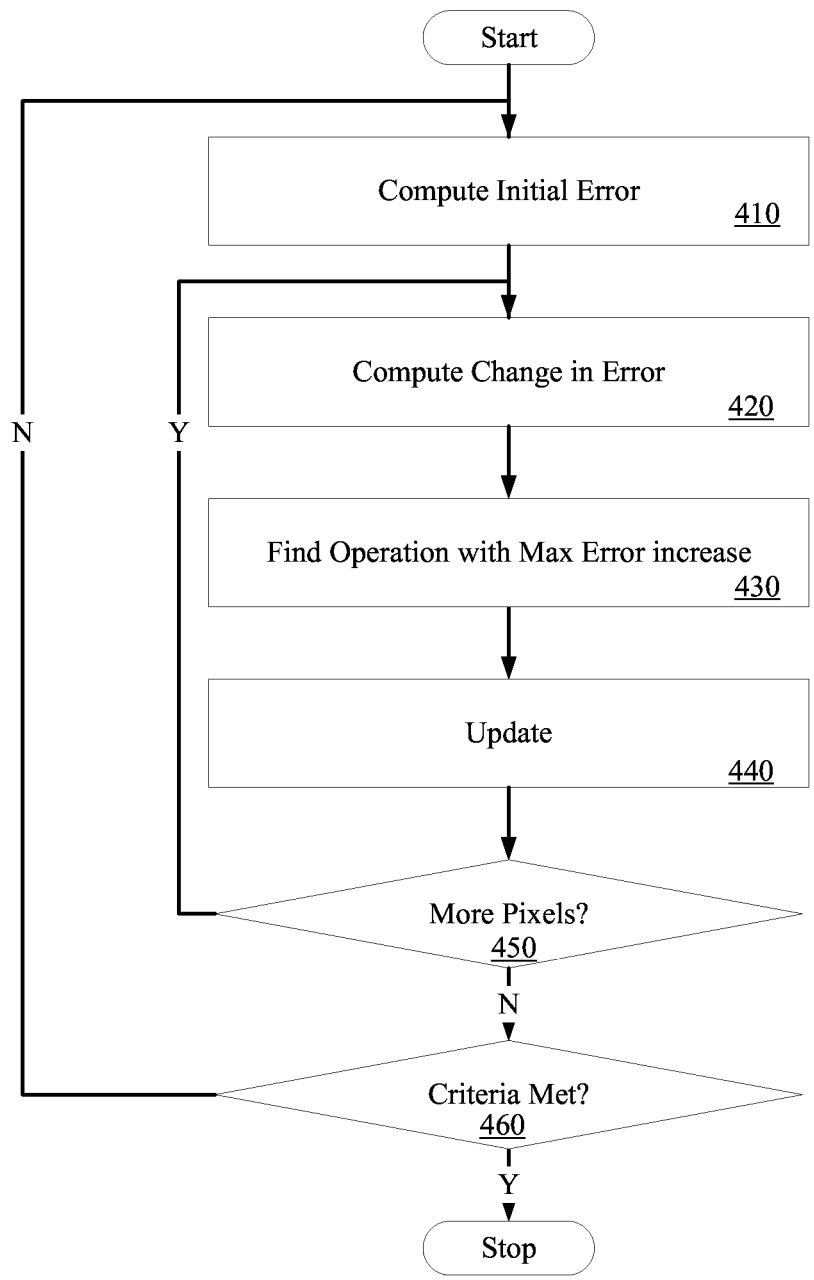
FIG. 4 is a flow diagram illustrating a further of embodiment of a multi-bit halftoning process.

FIG. 4 is a flow diagram illustrating one embodiment of performing pixel error processing. At processing block 410, the initial error $C_{\tilde{p}\tilde{e}}[m,n]$ between g and $f(m,n)$ is computed. At processing block 420, a change in $C_{\tilde{p}\tilde{e}}[m,n]$ is computed for a pixel. The change in $C_{\tilde{p}\tilde{e}}[m,n]$ is computed by toggling pixel $g(m,n)$ with all the possible output states as and swapping pixel $g(m,n)$ with all of the neighbors.

At processing block 430, the operation with maximum error decrease in $\Delta\epsilon$ is found for that pixel location. If there is no change in the error, then the next pixel is processed. At processing block 440, $C_{\tilde{p}\tilde{p}}[m,n]$ and $g(m,n)$ are updated reflecting the accepted change: $C_{\tilde{p}\tilde{e}}[m,n]' = C_{\tilde{p}\tilde{e}}[m,n] + a_i C_{\tilde{p}\tilde{p}}[m-m_i, n-n_i]$. At decision block 450, it is determined whether there are one or more additional pixels to process. If additional pixels are to be processed, the next pixel is processed according to processing blocks 420-440, described above.

However, if no more pixels need to be processed, it is determined whether an end criteria has been met, decision block 460. In one embodiment, the criteria have been met when no significant decrease in error is observed. In a further embodiment, the process is completed if the reduction in error is greater than 15% after the first iteration. If the criteria has not been met, control is returned to processing block 410 where the initial error is again computed. Referring back to FIG. 3, the output halftone is output once the criteria has been met, processing block 350.

According to one embodiment, the halftoning process may be split between halftoning module 214 at print controller 214 and printer 160 to decrease processing time at printer 160. In such an embodiment, the processes performed by processing blocks 310-330 are performed at halftoning module 214, while the processes performed by processing blocks 340 and 350 are performed at printer 160.

Figure 5:
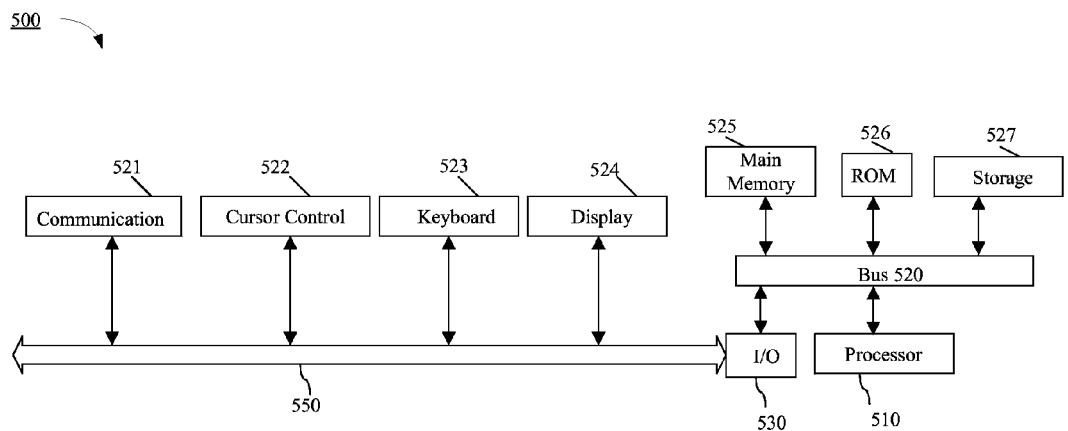
FIG. 5 illustrates one embodiment of a computer system.

FIG. 5 illustrates a computer system 500 on which print controller 140 and/or host system 110 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a non-transitory machine-readable medium including data that, when accessed by a machine, cause the machine to perform operations comprising:
    performing multi-bit halftoning of an image via a Direct Multi-bit Search (DMS), including:
        applying a human visual system (HVS) model to a Continuous Tone Image (CTI) and an initial Half Tone Image (HTI) to generate a perceived CTI and a perceived HTI; and
        computing a change in pixel error for a first pixel by:
            toggling the first pixel with all the possible output states; and
            swapping the first pixel with all neighbor pixels; and
            finding an operation with maximum error decrease for the first pixel.

2. The article of manufacture of claim 1 comprising a machine-readable medium including data that, when accessed by a machine, further cause the machine to perform computing a change in pixel error for a second pixel if no error decrease is found for the first pixel.

3. The article of manufacture of claim 1 comprising a machine-readable medium including data that, when accessed by a machine, further cause the machine to perform updating the HTI and the change in pixel error for the first pixel.

4. The article of manufacture of claim 3 comprising a machine-readable medium including data that, when accessed by a machine, further cause the machine to perform operations comprising:
    determining if there are additional pixels to process upon updating the change in pixel error for the first pixel; and
    determining if an end criteria has been met upon determining that there are no additional pixels to process.

5. The article of manufacture of claim 4 comprising a machine-readable medium including data that, when accessed by a machine, further cause the machine to perform operations comprising:
    computing a change in pixel error for a second pixel if there are additional pixels to process;
    finding an operation with maximum error decrease for the second pixel; and
    updating the change in pixel error for the second pixel.

6. The article of manufacture of claim 4 comprising a machine-readable medium including data that, when accessed by a machine, further cause the machine to perform operations comprising computing a change in pixel error for the first pixel if the end criteria has not been met.

7. The article of manufacture of claim 4 comprising a machine-readable medium including data that, when accessed by a machine, further cause the machine to perform operations comprising outputting a halftone if the end criteria has been met.

8. The article of manufacture of claim 7 wherein the end criteria has been met when no significant decrease in error is observed.

9. The article of manufacture of claim 7 wherein the end criteria has been met if the reduction in error is greater than user pre-defined threshold.

10. The article of manufacture of claim 1 comprising a machine-readable medium including data that, when accessed by a machine, further cause the machine to perform operations comprising computing an initial change in pixel error for the first pixel.

11. The article of manufacture of claim 1 comprising a machine-readable medium including data that, when accessed by a machine, further cause the machine to perform operations comprising generating the HVS model.

12. A system comprising:
    a print controller to perform multi-bit halftoning of an image via a Direct Multi-bit Search (DMS) algorithm, including:

a first processor to generate a Continuous Tone Image (CTI) with all pixel values same as a first gray level and an initial Half Tone Image (HTI) with all pixel values equal to minimum absorptance level and apply a human visual system (HVS) model to (CTI) and the initial HTI to generate a perceived CTI and a perceived HTI; and a second processor to compute a change in pixel error for a first pixel by toggling the first pixel with all the possible output states and swapping the first pixel with all neighbor pixels and compute an operation with maximum error decrease for the first pixel.

13. The system of claim 12 wherein the second processor updates the change in pixel error for the first pixel.

14. The system of claim 13 wherein the second processor determines if there are additional pixels to process upon updating the change in pixel error for the first pixel and determines if an end criteria has been met upon determining that there are no additional pixels to process.

15. The system of claim 14 wherein the second processor computes a change in pixel error for a second pixel if there are additional pixels to process, finds an operation with maximum error decrease for the second pixel and updates the change in pixel error for the second pixel.

16. The system of claim 15 wherein the second processor computes a change in pixel error for the first pixel if the end criteria has not been met.

17. The system of claim 16 wherein the end criteria has been met when no significant decrease in error is observed.

18. The system of claim 16 wherein the end criteria has been met if the reduction in error is greater than user predefined threshold.

19. The system of claim 12 wherein the first processor is located at a print controller and the second processor is located at a printer.

\* \* \* \* \*